Figure 1A:
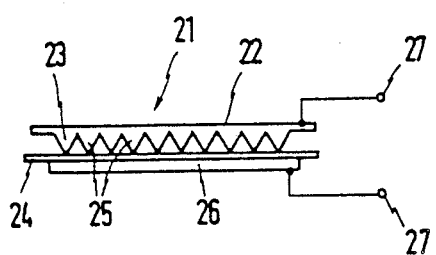

United States Patent [19]

Brunner et al.

[11] Patent Number: 4,986,136

[45] Date of Patent: Jan. 22, 1991

[54] MEASURING SYSTEM

[76] Inventors: Wolfgang Brunner, Ringenberg 175, D-8999 Maierhöfen; Ludwig von Zech, Argensee, D-7964 Kissleg, both of Fed. Rep. of Germany

[21] Appl. No.: 446,990

[22] Filed: Dec. 6, 1989

[30] Foreign Application Priority Data

Dec. 7, 1988 [DE] Fed. Rep. of Germany ... 8815246[U]

[51] Int. Cl.$^5$ ............................ G01L 5/16; G01L 1/14
[52] U.S. Cl. .............................. 73/862.04; 361/278; 361/283
[58] Field of Search ........... 73/862.04, 862.64, 862.68, 73/865.7; 341/33; 361/278, 283, 288, 291

[56] References Cited

U.S. PATENT DOCUMENTS

| | | | |
|---|---|---|---|
| 3,328,653 | 6/1967 | Wolf, Jr. ............................ | 361/283 |
| 3,875,481 | 4/1975 | Miller et al. ................... | 73/862.64 X |
| 4,793,193 | 12/1988 | Borgudd ........................ | 73/862.68 X |
| 4,852,443 | 8/1989 | Duncan et al. ................. | 361/291 X |

FOREIGN PATENT DOCUMENTS 2141873 1/1985 United Kingdom ............ 73/862.04

Primary Examiner—Charles A. Ruehl
Attorney, Agent, or Firm—Max Fogiel

[57] ABSTRACT

A measuring system in which flexible mats of individual cells are distributed in rows and columns of a matrix are individually pollable for converting mechanical pressures applied locally on surfaces of the mats, into electrical signals. Each cell constitutes a capacitor with capacitance that varies with the applied mechanical pressure. A source of voltage is connectable to each cell, and each cell has an upper surface and a lower surface. Pressure is applied to the upper surface, and a dielectric is positioned between the upper surface and the lower surface. The upper surface has a plurality of parallel strip-shaped areas with projections, whereas the lower surface has a plurality of parallel electrically conductive strip-shaped areas which extend at right angles to the first strip-shaped areas on one side of the dielectric to form a capacitor cell at each intersection. The intersections deforms resiliently under applied pressure to vary the capacitance under pressure.

10 Claims, 4 Drawing Sheets

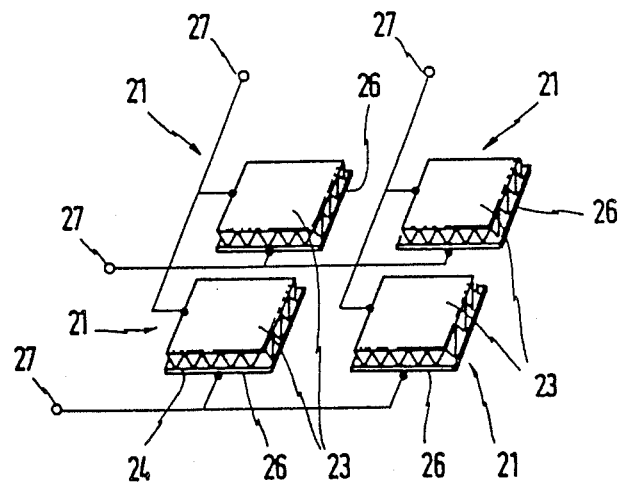
FIG. 7
FIG. 8
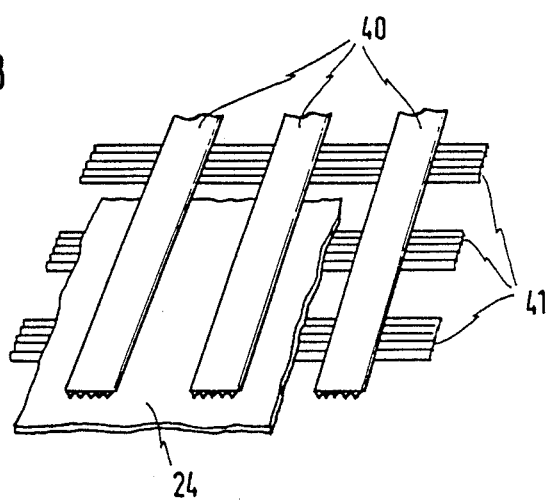

MEASURING SYSTEM

The invention concerns a measuring system, preferably in the form of a stage made out of flexible mats or individual cells.

A measuring system of this type is known (German OS No. 2,529,475 and German OS No. 3,642,088). The individual cells in the system convert mechanical pressure into an electric signal by varying their capacitances in that each cell is a capacitor and the pressure varies the distance between the upper and lower surface of the cell and hence its capacitance. Many measurement applications require several sensors per square centimeter. When the upper surface is only 1 to 2 mm away from the lower surface, the pressure can vary the capacitances of the cells only slightly, on the order of fractions of a picofarad (pF).

The object of the invention is to improve the known measuring system to the extent that each measuring point will have a considerably higher basic capacitance and accordingly a wider range of variation in its capacitance subject to pressure.

Thus the lower and/or the upper surface of each cell has a projection that tapers in toward the capacitor's dielectric, that is electrically conductive at least along its surface, and that can also be a rib that extends in one direction and, when pressure is applied, the projections are forced against the dielectric, which is electrically insulating, and flattened. This procedure increases the surface of the capacitor and hence its capacitance, and the dielectric, which can be a sheet mounted between the upper and lower surfaces, can in practice be as thin as desired, considerably increasing the range of capacitances on the order of several nanofarads (nF). Furthermore, when pressure is applied, the distance between the sloping and tapering surfaces and the other surface decreases, additionally increasing the capacitance. Preliminary tests indicate 100 times more increments in the range of capacitance than with generic sensors. The resulting increase in the signal-to-noise ratio and extension of the range of measurement are of particular advantage.

In one preferred embodiment of the invention the projections that taper in toward the dielectric are mounted on only one surface and both the dielectric and the other surface are intact sheets, the latter being electrically conductive on the whole as well as being coated intactly electrically conductive in the form of a single counter-electrode, in which case each projection is to be electrically polled individually or all the projections in one cell individually. It is on the other hand also possible instead of an intact contact for the surface that does not have the projections to have many separate conducting coatings that dictate the geometry of the cells, in which case the surface with the projections will be coated electrically intact and connected on the whole to one pole of the source of voltage. It is of course also possible to provide a separate electric supply line for one cell on both the upper and lower surface. It is of particular advantage for the projections to be in the form of a cone or truncated pyramid.

In an alternative embodiment of the invention, however, there are several parallel ribs that taper in toward the dielectric on one surface, whereby the other surface of each cell has ribs that extend at an angle and preferably a right angle to the ribs on the other side. This embodiment is easy to obtain by providing several parallel strip-shaped areas with the projections on one side, whereas the other surface has several parallel also electrically conductive strips that extend at an angle and preferably a right angle to the strip-shaped areas on the other side of the dielectric, creating a region of intersection in each capacitor in the form of a cell. In this embodiment, accordingly, each strip-shaped area in the overall matrix-like measuring system is in itself electrically conductive at its surface and has a separate electric connection. Thus, the cells in the vicinity of the intersection of the two strip-shape areas can be activated by selecting one strip-shaped area on the upper surface and another extending at an angle to it on the lower surface.

Figure 1B:
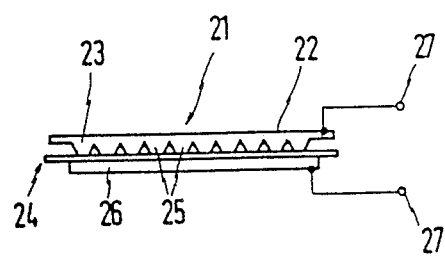
Figure 1C:
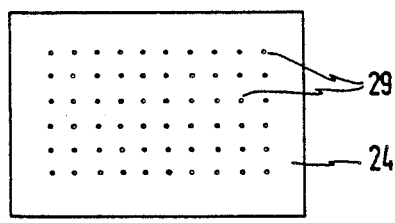
Figure 1D:
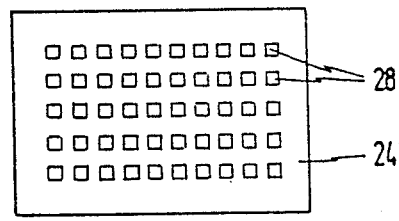
Figure 2:
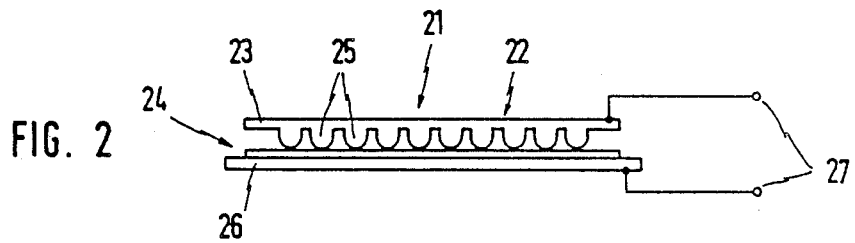
Figure 3:
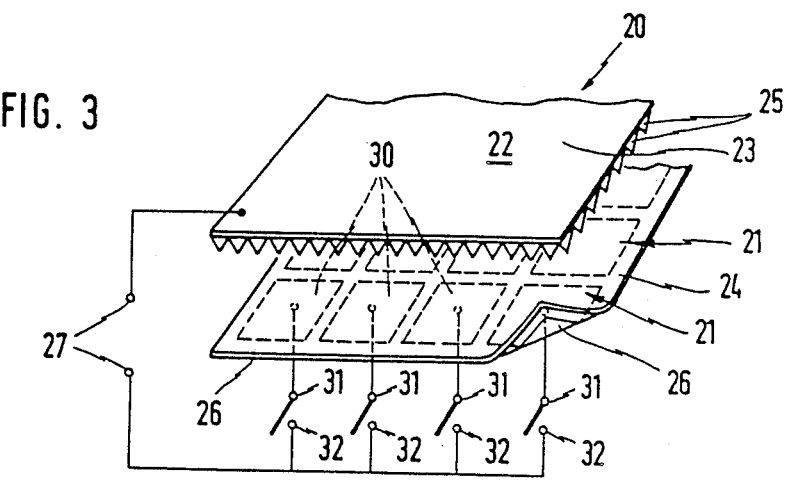
Figure 4:
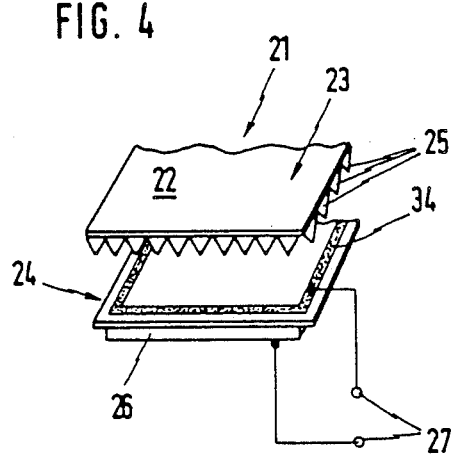
Figure 5:
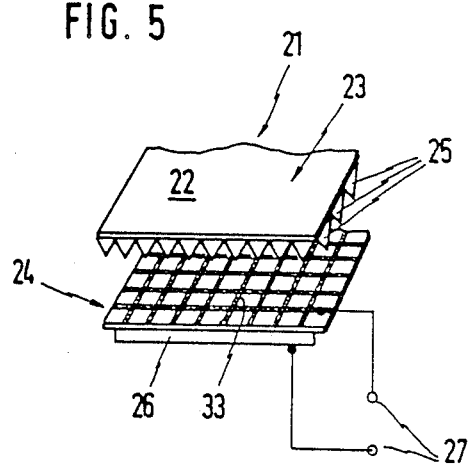
Figure 6:
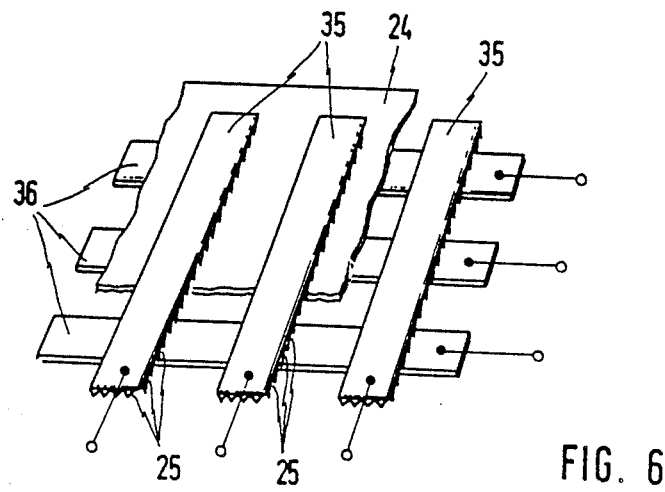
Figure 9:
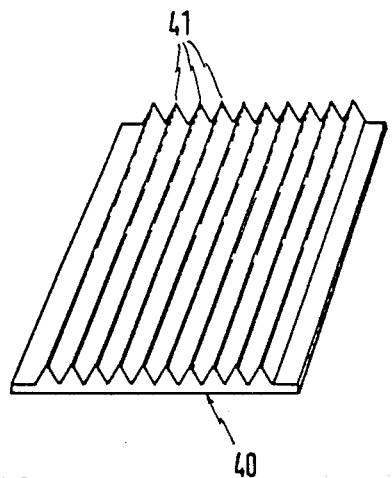
Figure 10:
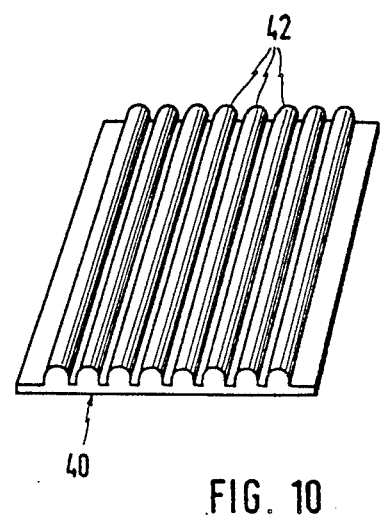
Figure 11:
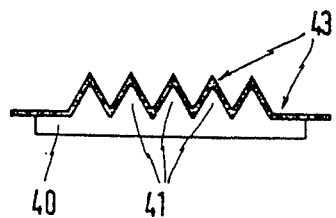

Several preferred embodiments of the invention will now be described with reference to the drawing, wherein FIG. 1a is a schematic section through a mechanically unstressed cell from a measuring system in accordance with the invention, FIG. 1b illustrates the cell in FIG. 1a subject to mechanical stress, FIG. 1c is a schematic top view of the contact areas on/the upper surface of the cell in the dielectric, FIG. 1d is the same view as FIG. 1c although during the mechanical stress represented in FIG. 1b, FIG. 2 illustrates another embodiment of a cell, FIG. 3 is an exploded view of another embodiment of a measuring system with many cells, FIG. 4 is an exploded view of another embodiment of a cell, FIG. 5 is an exploded view of another embodiment of a cell, FIG. 6 is a schematic perspective representation of another embodiment of a measuring system with strip-shaped areas that intersect in the form of a matrix, FIG. 7 is a schematic representation of another embodiment of a measuring system with many cells, FIG. 8 is a schematic perspective view of one alternative to the embodiment illustrated in FIG. 6 but with projections in the form of parallel ribs, FIG. 9 is a perspective view of one embodiment of the ribs in the measuring system illustrated in FIG. 8, FIG. 10 is a perspective view of another embodiment of the rib-shaped projections in the measuring system illustrated in FIG. 8, and FIG. 11 is a section through the system illustrated in FIG. 9.

A measuring system 20 (FIG. 3) comprises many cells 21 (FIG. that accommodate mechanical pressures on their surface 22 and convert them into electric signals. The surface 22 in question comprises the upper surface 23 of measuring system The overall function of system will now be described with reference to the cell illustrated in FIG. 1. Its upper surface 23 has a number of projections 25 that taper in toward a dielectric 24, that are electrically conductive at the surface, and that deform resiliently subject to pressure.

The lower surface 26 in the illustrated embodiment is a flat sheet that is entirely electrically conductive, at least the area that comes into contact with dielectric 24. The upper and lower surfaces are connected by way of connectors 27 to an unillustrated source of voltage. FIGS. 1a and 1c illustrate the cell with no pressure applied to the surface 22 of its upper surface 23 and FIGS. 1b and 1d illustrate it with the surface subject to pressure. It will be evident that, when the cell is subject to pressure, projections 25 become resiliently deformed and produce areas 28 of contact with dielectric 24 that are larger than the areas 29 (FIG. 1c) characteristic when no pressure is being applied to upper surface 23. Subjecting the cell to pressure accordingly increases both the active surface of the cell and hence the capacitance of the capacitor it represents. Changes in capacitance can easily be measured.

FIG. 2 illustrates an alternative embodiment wherein the projections are in the form, not of cones, pyramids, or frusta, but of knobs. These projections are preferably made of conductive silicon rubber.

In the embodiment illustrated in FIG. 3 it will be evident that upper surface 23, at least in the vicinity of projections 25, is on the whole connected to an electric connector 27. Lower surface 26 on the other hand is provided with a more or less rectangular coating that dictates the geometry of each cell 21 and that is connected by way of a separate connector 31 and of a schematically illustrated electronic switch 32 to second electric connector 27, allowing each cell to be polled.

FIGS. 4 and 5 illustrate various ways of establishing contact with the upper surface 23 of the embodiment illustrated in FIG. 1. Thus, either an intersecting grid 33 or a rectangular border 34 around each cell can be imprinted on dielectric 24 and connected to electric connectors 27 in a system like that illustrated in FIG. 3. The cells 21 illustrated in FIGS. 4 and 5 can of course also be employed in the embodiment illustrated in FIG. 7.

One surface, the upper surface for example, of the embodiment illustrated in FIG. 6, has several parallel strip-shaped areas 35 with projections. The other surface has several also parallel strip-shaped areas 36 that extend at an angle and preferably at a right angle to strip-shaped areas 35 on the other side of dielectric 24. The areas that face dielectric 24 are, at least at the surface, electrically conductive, and one cell in the form of a capacitor is created at each intersection of strip-shaped areas 35 and 36. It is of course also possible to provide at least one electrically conductive surface of a strip-shaped area 35 or 36 with a dielectric in the form of an insulating layer instead of dielectric 24.

Instead of the individual pyramidal or frustal projections represented in FIGS. 1 through 7, it is also possible in a system that employs strip-shaped areas as illustrated in FIG. 6 to provide the areas with a number of parallel ribs that taper in toward the dielectric. A single rib can of course also be employed instead of several ribs. The areas on the upper surface are labeled 40 in FIG. 8 and those on the lower surface with 41. FIGS. 9 and 10 are perspective views of areas 40 of various shapes. It will be evident that the strip-shaped area 40 on the upper surface has a number of ribs 41 with a triangular cross-section (FIG. 9) or of ribs 42 with a semicircular cross-section (FIG. 10). Here again, as in the embodiment illustrated in FIG. 6, there can be a dielectric 24 or there can be no dielectric and at least one surface of upper strip-shaped areas 40 or of lower strip-shaped areas 41 can be provided with an electrically insulating coating 43 that acts as a dielectric. Either system will result in a cell in the form of a capacitor at each intersection.

We claim:

1. A measuring system comprising: flexible mats of individual cells distributed in rows and columns of a matrix and being individually pollable for converting mechanical pressures applied locally on surfaces of said mats into electrical signals; each cell comprising a capacitor having a capacitance varying with the applied mechanical pressure; a source of voltage connectable to each said cell; each cell having an upper surface and a lower surface, said pressure being applied to said upper surface; a dielectric positioned between said upper surface and said lower surface; said upper surface having a plurality of parallel first strip-shaped areas with projections; said lower surface having also a plurality of parallel electrically conductive second strip-shaped areas extending at a substantially right angle to said first strip-shaped areas on one side of said dielectric for forming a capacitor cell at each intersection, said intersection deforming resiliently under applied pressure to vary said capacitance under pressure.

2. A measuring system as defined in claim 1, wherein said projections on said upper surface comprise parallel ribs tapering in toward said dielectric.

3. A measuring system as defined in claim 2, wherein said lower surface has also parallel ribs tapering in toward said dielectric.

4. A measuring system as defined in claim 3, wherein the parallel ribs on said lower surface are in said strip-shaped areas.

5. A measuring system as defined in claim 3, wherein said dielectric comprises an electrically non-conductive coating on surfaces of said ribs on said upper surface and said lower surface.

6. A measuring system as defined in claim 2, wherein said ribs have a triangular cross-section.

7. A measuring system as defined in claim 2, wherein said ribs have a semi-circular cross-section.

8. A measuring system as defined in claim 2, wherein said ribs are in said strip-shaped areas.

9. A measuring system as defined in claim 2, wherein said dielectric comprises an electrically non-conductive coating on surfaces of said ribs.

10. A measuring system comprising: flexible mats of individual cells distributed in rows and columns of a matrix and being individually pollable for converting mechanical pressures applied locally on surfaces of said mats into electrical signals; each cell comprising a capacitor having a capacitance varying with the applied mechanical pressure; a source of voltage connectable to each said cell; each cell having an upper surface and a lower surface, said pressure being applied to said upper surface; a dielectric positioned between said upper surface and said lower surface; said upper surface having a plurality of parallel first strip-shaped areas with projections; said lower surface having also a plurality of parallel electrically conductive second strip-shaped areas extending at a substantially right angle to said first strip-shaped areas on one side of said dielectric for forming a capacitor cell at each intersection, said intersection deforming resiliently under applied pressure to vary said capacitance under pressure; said projections on said upper surface comprising parallel ribs tapering in toward said dielectric; said lower surface having also parallel ribs tapering in towards said dielectric; said ribs having a predetermined cross-section; said ribs being in said strip-shaped areas; said dielectric comprising an electrically non-conductive coating on surfaces of said ribs.

* * * * *